United States Patent [19]

Schack et al.

[11] 4,315,393
[45] Feb. 16, 1982

[54] INSERT FOR SUPPORTING HANGERS FOR CONDUIT, PIPE, CABLES, ETC., IN A CHANNEL MEMBER

[76] Inventors: James B. Schack, 13841 SE. 241st, Kent, Wash. 98031; Timothy L. Marks, 914 Lynnwood Ave. NE., Renton, Wash. 98055

[21] Appl. No.: 98,472

[22] Filed: Nov. 29, 1979

[51] Int. Cl.³ .............................................. E04B 1/38
[52] U.S. Cl. .................................... 52/710; 411/427; 411/908
[58] Field of Search ................. 52/710, 711, 704, 717; 151/7, 38; 85/32 R

[56] References Cited

U.S. PATENT DOCUMENTS

| | | | |
|---|---|---|---|
| 1,229,911 | 6/1917 | Dodds | 151/38 |
| 3,493,025 | 2/1970 | La Londe | 52/710 |
| 4,040,228 | 8/1977 | Skubic | 52/710 |
| 4,130,977 | 12/1978 | Taylor et al. | 52/710 |
| 4,169,630 | 10/1979 | Wagner | 151/38 X |

FOREIGN PATENT DOCUMENTS 853581 11/1960 United Kingdom .................. 52/710

*Primary Examiner*—J. Karl Bell

[57] ABSTRACT

An insert is disclosed for insertion into a U-shaped channel member for supporting hangers carrying cables, pipes, conduits and the like. The U-channel is a structural support element which is secured to a suitable substrate or, more commonly, embedded in concrete walls. The insert includes a main body portion of greater length than width having a threaded bore therethrough for insertion of a bolt therein, the bolt holding the support member in place. The insert also includes integral resilient legs extending from the rear wall of the insert and contacting the rear wall of the channel member, the legs biasing the insert forwardly against the side walls of the channel member.

12 Claims, 5 Drawing Figures

INSERT FOR SUPPORTING HANGERS FOR CONDUIT, PIPE, CABLES, ETC., IN A CHANNEL MEMBER

BACKGROUND OF THE INVENTION

Field of the Invention

This invention relates to an insert received in a U-shaped channel member for supporting clamps, cleats, etc., used for supporting cables, pipes, conduit and the like.

Prior Art Relating to the Disclosure

U-shaped structural elements are generally embedded in castable materials, such as concrete walls, and are employed to support clamps and cleats used for supporting cables, pipes, conduit, etc. These structural elements are generally U-shaped with inwardly turned flanges which define a continuous slot at the opening of the "U" and are cast in situ or in pre-cast sections. These U-shaped members are commonly used in concrete underground utility vaults or utility trench sections for supporting electrical cable, conduit, water pipes, sewer pipes, gas lines, etc. The usual means of supporting such materials is to rest them on hangers or clamps connected to inserts inserted into the U- shaped channel members embedded in the side wall of the utility vault or utility trench section. The inserts which have been generally used are metal spring-loaded nuts housed within a U-shaped metal channel member, the clamp or hanger secured to the spring-loaded nut by a clamping bolt extending through the clamp or hanger and through the spring-loaded nut. Such a system is illustrated, for example, in Australian Pat. No. 279,441. The principal disadvantages of the spring-loaded nut and metal channel system include: (1) corrosion of the metal pieces and (2) uneven loading of the nut against the inwardly directed flanges of the channel member, tending to cause failure of the flange of the channel member.

SUMMARY OF THE INVENTION

It is a primary object of this invention to provide a threaded insert for insertion into a U-channel member for supporting hangers or clamps used in supporting cables, conduit, pipe and the like, the insert biased forwardly against the side walls of the channel member by resilient legs which contact the rear wall of the U-channel member.

It is another object of this invention to provide a threaded insert for insertion into a U-channel member which can be easily removed from and inserted into the U-channel member.

It is a further object of this invention to provide a U-shaped channel member and insert therefor fabricated from corrosion-resistant materials, such as structural synthetic plastic materials.

It is a further object of this invention to provide a U-shaped channel member of a structural synthetic plastic material which can accept either a spring-loaded nut or the insert described herein.

It is a still further object of this invention to provide a U-shaped channel member and insert shaped so that the insert, after being positioned within the channel member, can be rotated about a horizontal axis extending through the insert along its width dimension so that a bolt can be inserted into the threaded bore of the insert at an angle other than normal to the rear wall of the channel member.

It is a further object of this invention to provide a threaded insert for insertion into a U-channel member for supporting hangers and clamps which can be inexpensively manufactured.

It is a further object of this invention to provide a threaded insert for insertion into a U-shaped channel member, the side walls of the channel member and the front surfaces of the insert in contact with the side walls designed to allow rotation of the insert about a horizontal axis extending along the width dimension of the insert, the insert designed to transfer any load imposed thereon through the walls of the channel member into the concrete wall in which the channel-member is embedded.

These and other objects are accomplished by a removable insert having a main body portion of greater length than width, the width of the body portion being less than the width of the entry opening of the channel member to allow insertion of the insert in the channel member, a depth less than the depth of the channel member, and a length adapted to engage the side walls of the channel member, threaded bore extending through the main body portion so that it is accessible for receiving a bolt through the entry opening of the channel member, when the insert is in place, and integral resilient legs extending from the rear wall of the body portion adapted to contact the rear wall of the channel member and bias the insert into firm contact with the side walls of the channel member.

DESCRIPTION OF THE PREFERRED EMBODIMENTS

Figure 1:
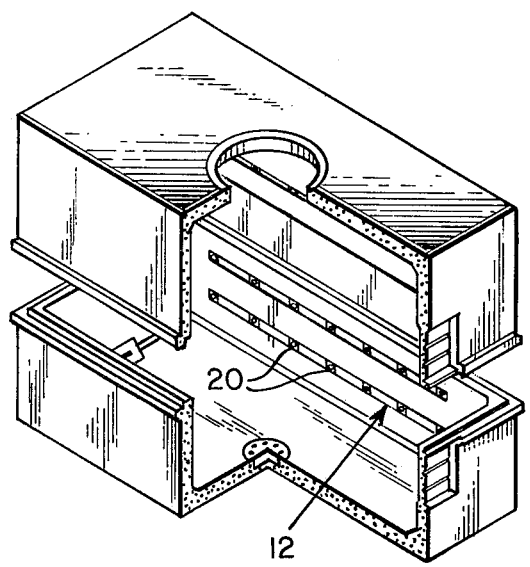
FIG. 1 is a perspective view of a concrete utility vault having a U-channel member embedded in the side walls thereof and inserts of the type illustrated in FIGS. 2 to 4 inserted within the U-channel member.
Figure 2:
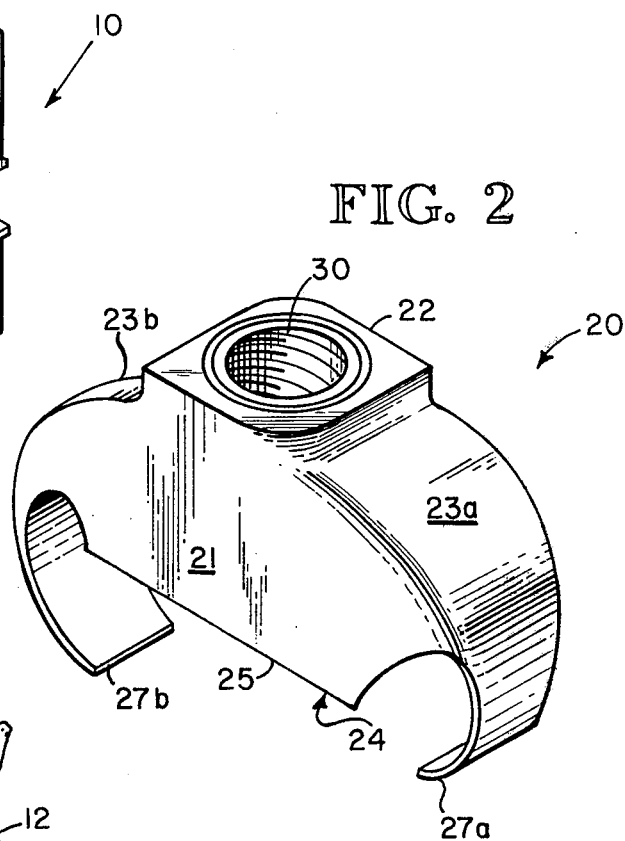
FIG. 2 is a perspective view of the insert of this invention.
Figure 3:
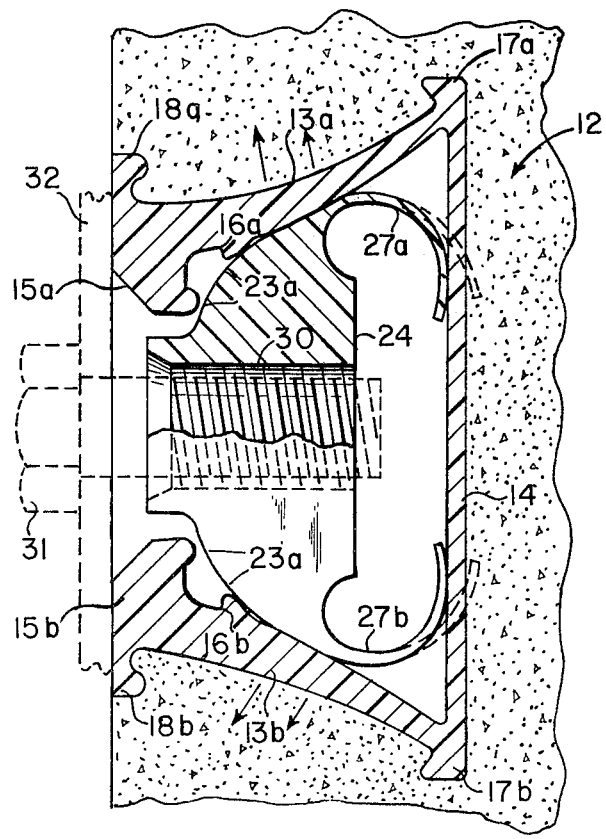
FIG. 3 is a vertical cros-sectional view through a concrete wall having a U-channel member embedded therein with the insert of FIG. 2 inserted in place within the U-channel member and a support bolted thereto, the U-channel designed to accept the insert described herein or a spring-loaded nut of the type previously used.

Referring to the drawings, in particular FIG. 1, a concrete vault 10 has supporting channel members 12 embedded in the side walls thereof. Such channel members can be cast or mounted on vertical, horizontal or other surfaces. The channel member 12 is of a "U" configuration having legs 13a and 13b interconnecting with a base 14. The channel member may be provided with inwardly directed integral flange portions 15a and 15b as illustrated in FIG. 3, the flanges defining between them an opening through which the insert of FIG. 2 is received. The channel member may include lugs 17a, 17b, 18a and 18b to aid in locking the channel member within the concrete matrix. The side walls 13a and 13b of the channel member are also provided with longitudinally extending ridges 16a and 16b positioned to contact the front surfaces of the insert 20 as will be described. The inwardly directed flanges 15a and 15b are provided so that the channel member may be used in conjunction with a spring-loaded nut of the type illustrated in Australian Patent No. 279,441 in lieu of the insert of FIG. 1.

Figure 5:
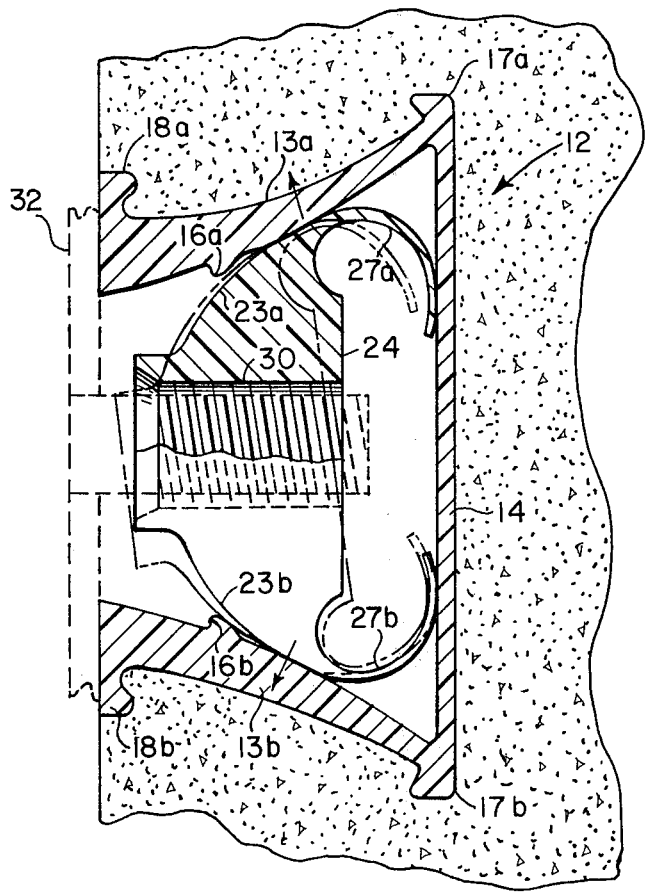
FIG. 5 is a vertical cross-sectional view through a concrete wall having a modified U-channel member embedded therein with the insert of FIG. 2 inserted therein.

FIG. 5 illustrates a U-channel member in which the inwardly directed flanges are omitted since they are not needed to retain the insert described herein within the channel member.

The insert 20, as illustrated in perspective in FIG. 2, includes a main body 21 having a forwardly extending portion 22 adapted to extend into the entry opening of the U-channel. The front surfaces 23a and 23b of the insert slope rearwardly from the portion 22 so as to fit the contours of the side walls or legs 13a and 13b of the U-channel. The surfaces 23a and 23b are adapted to contact the respective side walls 13a and 13b back of the ridges 16a and 16b as illustrated in FIGS. 3 and 5, so that any forwardly directed force exerted on the insert (due to the weight of a support 32, for example) are transmitted into the concrete through the portions of the side walls 13a and 13b contacted by the insert, as illustrated by the arrows in FIGS. 3 and 5. This is a distinct advantage over the spring-loaded nut inserts previously used where any forwardly directed force exerted on the nut are transmitted wholly against the inwardly directed flanges 15a and 15b of the channel member, tending to cause failure of that portion of the channel member, particularly if the channel member is fabricated from a synthetic plastic material.

The main body 21 also includes a rear surface 24 and side walls 25 and 26. The insert is of greater length than width, the width of the insert being somewhat less than the width of the entry opening of the U-channel member to allow insertion of the insert through the opening into the U-channel member. The length of the insert is determined by the distance between the side walls of the U-channel member and is adapted to fit within the U-channel member as illustrated in FIGS. 3 and 5. Extending from the rear walls at each end of the insert are a pair of integral resilient legs 27a and 27b which are relatively thin in cross-section relative to the thickness of the insert. The legs 27a and 27b contact the rear wall 14 of the channel member and bias the front surfaces 23a and 23b of the insert into contact with the side walls of the U-channel.

Figure 4:
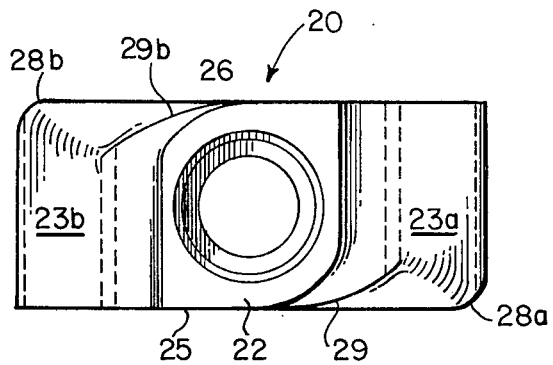
FIG. 4 is a top view of the insert of FIG. 2.

To provide for easy rotation of the insert into position in the U-channel after insertion through the entry opening of the channel member, opposed side edges 28a and 28b of the main body 21, and 29a and 29b of the protruding section 22 may be beveled as illustrated in FIG. 4. The insert is inserted into the entry opening of the U-channel member in a horizontal position and then rotated to the vertical position illustrated in FIGS. 3 and 5. A threaded bore opening 30 extends through the insert as illustrated in FIGS. 3 and 5 for receiving a bolt 31, the bolt securing a hanger or clamp 32 to the U-channel member through the insert. Because the remaining edges of the insert are not beveled, the insert cannot be easily twisted within the channel to dislodge it from place. The insert and channel member are preferably fabricated from a suitable non-corrosive structural material which is reasonably rigid. Polycarbonate, nylon or reinforced nylon plastics have been found to be the most suitable materials, although other materials may be equally applicable.

An additional advantage of the insert described herein is the ability to rotate it, about a horizontal axis extending through the width of the insert for accepting a bolt into the threaded bore thereof at an angle other than normal to the rear wall of the U-channel member. This is illustrated in phantom in FIG. 5.

We claim:

1. A removable insert for insertion in a carrier member having a U-shaped cross-section, the carrier member having a rear wall forming the base of the "U" and side walls forming the legs of the "U" and defining an entry opening therebetween, the insert connectable to supports for cables, pipes, conduits and the like comprising:

a main body having a front wall with rearwardly sloping surfaces, a rear wall and side walls joining the front and rear walls, the body of greater length than width, the width being less than the width of the entry opening between the legs of the channel member to allow insertion of the insert into the channel member, the depth of the insert being less than the depth of the channel member and the length of the insert determined by the distance between the side walls of the channel member, the length being sufficient for the sloping surfaces of the insert to contact the side walls of the channel member;

a threaded bore extending through the main body from the front wall to the rear wall for receiving a bolt therein through the entry opening of the channel member when the insert is positioned in place within the channel member; and integral resilient legs extending from the rear wall of the main body adapted to contact the rear wall of the channel member and bias the sloping surfaces of the front wall of the insert into contact with the side walls of the channel member.

2. The insert of claim 1, wherein the front wall of the insert includes a protruding portion which protrudes into the entry opening of the channel member when the insert is positioned in place within the channel member.

3. The insert of claim 1, wherein the legs of the insert are curved toward each other from opposite ends of the insert and are relatively thin in cross-section in relation to the width of the main body of the insert.

4. The insert of claim 1, wherein two opposed edges formed by meeting of the front and side walls of the insert are beveled to allow the insert to be easily rotated within the channel member only in one direction after insertion through the entry opening thereof.

5. The insert of claim 1, wherein the insert is rotatable within the channel member about a horizontal axis extending through the width dimension thereof to allow insertion of a bolt into the threaded bore at varying angles relative to the channel member.

6. The insert of claim 1, wherein the sloping surfaces of the insert transmit any load exterted on the insert to the side walls of the channel member.

7. A removable insert for use with a channel structural member having a generally U-shaped configuration, the legs of the "U" forming the side walls of the channel structural member, the side walls defining an entry opening therebetween, the insert comprising:

a main body of greater length than width, the width being less than the width of the entry opening of the channel member to allow insertion into the channel, the depth being less than the depth of the channel member and the length being such that when the insert is inserted into the channel member through the entry opening and rotated about 90°, the insert engages the side walls of the channel member;

a threaded bore opening extending through the main body for receipt of a bolt therein when the insert is in place in the channel member; and integral resilient legs extending from the rear of the main body into contact with the rear wall of the channel member for biasing the insert forwardly.

8. A system for supporting cables, pipes, conduits and the like, comprising:

a longitudinally extending channel member cast in situ in a concrete wall having a U-shaped cross-sectional configuration with the side walls of the U sloping towards each other beginning at the rear wall thereof, the terminating ends of the side walls defining an entry opening therebetween, and integral longitudinally extending ridges extending along the inner surface of each side wall between the entry opening and the rear wall, a removable insert for insertion into the channel member, the insert having (1) a front wall with rearwardly sloping surfaces adapted to contact the respective ridges of the channel member and sloping side walls of the channel member between the ridges and rear wall of the channel member when the insert is positioned in place within the channel member, (2) a rear wall, and (3) respective side walls joining the front and rear walls, the insert having a width less than the width of the entry opening of the channel member to allow insertion of the insert into the channel member, a length sufficient to allow the sloping surfaces to engage the side walls of the channel member when the insert is inserted into the channel member through the entry opening and rotated about 90°, and a depth less than the depth of the channel member; a threaded bore extending into and through the front wall of the insert for receiving a bolt therein through the entry opening of the channel member when the insert is rotated in place in the channel member; and integral resilient legs extending from the rear wall of the insert contacting the rear wall of the channel member and biasing the sloping surfaces of the insert into contact with the side walls of the channel member.

9. The system of claim 8, wherein the insert and channel member are fabricated from a synthetic plastic material.

10. The insert of claim 8, wherein the insert is rotatable within the channel member about a horizontal axis extending through the width dimension thereof to allow insertion of a bolt into the threaded bore at varying angles relative to the channel member.

11. The insert of claim 8, wherein two opposed edges formed by meeting of the front and side walls of the insert are beveled to allow the insert to be easily rotated within the channel member only in one direction after insertion through the entry opening thereof.

12. The system of claim 8, wherein the sloping surfaces of the insert transmit any load exerted on the insert through the side walls of the channel member into the concrete wall in which the channel member is cast.

* * * * *